(12) United States Patent
Pelka

(10) Patent No.: US 10,503,010 B2
(45) Date of Patent: Dec. 10, 2019

(54) THIN DIRECT-VIEW LED BACKLIGHTS

(71) Applicants: Seoul Semiconductor Co., Ltd., Ansan-si (KR); InteLED Corp., Huntingdon Beach, CA (US)

(72) Inventor: David Pelka, Los Angeles, CA (US)

(73) Assignees: Seoul Semiconductor Co., Ltd., Ansan-si (KR); InteLED Corp., Huntington Beach, CA (US)

( * ) Notice: Subject to any disclaimer, the term of this patent is extended or adjusted under 35 U.S.C. 154(b) by 124 days.

(21) Appl. No.: 15/593,697

(22) Filed: May 12, 2017

(65) Prior Publication Data

US 2017/0248822 A1    Aug. 31, 2017

Related U.S. Application Data

(63) Continuation-in-part of application No. 14/943,685, filed on Nov. 17, 2015, now Pat. No. 9,880,417, (Continued)

(51) Int. Cl.
    G02F 1/1335    (2006.01)
    F21V 5/04      (2006.01)
    (Continued)

(52) U.S. Cl.
    CPC ........ G02F 1/133606 (2013.01); F21V 5/048 (2013.01); F21V 5/08 (2013.01);
    (Continued)

(58) Field of Classification Search
    CPC ......... G02F 1/133606; G02F 1/133603; G02F 1/133611; G02F 2001/133607;
    (Continued)

(56) References Cited

U.S. PATENT DOCUMENTS 7,348,723 B2    3/2008 Yamaguchi et al.
7,674,019 B2    3/2010 Parkyn et al.
(Continued)

FOREIGN PATENT DOCUMENTS

JP    2009-500663    1/2011
JP    2011-023204    2/2011
(Continued)

OTHER PUBLICATIONS

Final Office Action dated Aug. 14, 2017 in U.S. Appl. No. 14/943,685.
(Continued)

*Primary Examiner* — Bao Q Truong
(74) *Attorney, Agent, or Firm* — H.C. Park & Associates, PLC

(57) ABSTRACT

A light-emitting apparatus including a light-emitting element and a lens covering the light-emitting element. The lens includes an upper surface having a convex shape and a lower surface including a cavity to which light emitted from the light-emitting elements is incident, in which the cavity includes an apex facing an upper surface of the light-emitting element and configured to reduce Fresnel reflections emitted vertically.

14 Claims, 18 Drawing Sheets
(13 of 18 Drawing Sheet(s) Filed in Color)

Related U.S. Application Data which is a continuation of application No. 13/973,704, filed on Aug. 22, 2013, now Pat. No. 9,255,695.

(60) Provisional application No. 61/692,024, filed on Aug. 22, 2012, provisional application No. 62/336,146, filed on May 13, 2016.

(51) Int. Cl.
 F21V 5/08 (2006.01)
 G02B 19/00 (2006.01)
 F21Y 115/10 (2016.01)

(52) U.S. Cl.
 CPC ..... G02B 19/0014 (2013.01); G02B 19/0061 (2013.01); G02F 1/133603 (2013.01); G02F 1/133611 (2013.01); *F21Y 2115/10* (2016.08); *G02F 2001/133607* (2013.01)

(58) Field of Classification Search
 CPC ...... G02F 1/133602; F21V 5/048; F21V 5/08; F21V 5/046; F21V 5/04; F21V 5/007; F21V 5/00; F21V 13/00; F21V 13/02; F21V 13/12; G02B 19/0014; G02B 19/0061; F21Y 2115/10
 See application file for complete search history.

(56) References Cited

U.S. PATENT DOCUMENTS

| | | |
|---|---|---|
| 7,798,679 B2 | 9/2010 | Kokubo et al. |
| 8,025,429 B2 | 9/2011 | Ho et al. |
| 8,227,969 B2 | 7/2012 | Yamaguchi et al. |
| 8,328,395 B2 | 12/2012 | Kato et al. |
| 8,714,783 B2 | 5/2014 | Lee et al. |
| 8,845,119 B2 | 9/2014 | Iiyama et al. |
| 2003/0156416 A1 | 8/2003 | Stopa et al. |
| 2007/0002453 A1 | 1/2007 | Munro |
| 2009/0116245 A1 | 5/2009 | Yamaguchi |
| 2010/0165640 A1 | 7/2010 | Lin et al. |
| 2011/0164426 A1 | 7/2011 | Lee |
| 2011/0182085 A1 | 7/2011 | Ko et al. |
| 2011/0317432 A1 | 12/2011 | Lee |
| 2012/0050889 A1 | 3/2012 | Lu |
| 2012/0081614 A1 | 4/2012 | Yamamoto |
| 2012/0105739 A1 | 5/2012 | Shimizu |
| 2012/0120343 A1 | 5/2012 | Yamamoto |
| 2012/0176802 A1 | 7/2012 | Householder et al. |
| 2012/0268940 A1 | 10/2012 | Sahlin et al. |
| 2013/0114021 A1* | 5/2013 | Iiyama ............... G02B 19/0009 349/64 |
| 2013/0170208 A1 | 7/2013 | Kuwaharada et al. |
| 2013/0235590 A1 | 9/2013 | Van Der Sijde et al. |
| 2014/0009944 A1 | 1/2014 | Fukuda |
| 2014/0104816 A1 | 4/2014 | Takasi et al. |
| 2016/0195238 A1* | 7/2016 | Han .................. G02F 1/133606 362/311.09 |
| 2016/0252233 A1* | 9/2016 | Han ......................... G02B 3/00 362/308 |
| 2017/0059932 A1* | 3/2017 | Hong ..................... G02B 6/005 |

FOREIGN PATENT DOCUMENTS

| | | |
|---|---|---|
| JP | 2011-198479 | 10/2011 |
| TW | 201033537 | 9/2010 |
| WO | 2011/010488 | 1/2011 |
| WO | 2011/114608 | 9/2011 |

OTHER PUBLICATIONS

International Search Report dated Mar. 6, 2014, International Application No. PCT/US13/56234.
Written Opinion dated Mar. 6, 2014, International Application No. PCT/US13/56234.
Non-Final Office Action dated Jan. 15, 2015 in U.S. Appl. No. 13/973,704.
Final Office Action dated Jul. 22, 2015 in U.S. Appl. No. 13/973,704.
Notice of Allowance dated Oct. 2, 2015 in U.S. Appl. No. 13/973,704.
Non-Final Office Action dated Mar. 24, 2017 in U.S. Appl. No. 14/943,685.

* cited by examiner

FIG. 17

| Anti-reflective coating |
|---|
| Absorption filter |
| Anti-reflective coating |
| 1st BEF |
| 2nd BEF |
| Diffuser |

THIN DIRECT-VIEW LED BACKLIGHTS

CROSS-REFERENCE TO RELATED APPLICATIONS

This application is a continuation-in-part of U.S. patent application Ser. No. 14/943,685, filed on Nov. 17, 2015, which is a continuation of U.S. patent application Ser. No. 13/973,704, filed on Aug. 22, 2013, now issued as U.S. Pat. No. 9,255,695, and claims the benefit of U.S. Provisional Patent Application No. 61/692,024, filed on Aug. 22, 2012, and U.S. Provisional Patent Application No. 62/336,146, filed on May 13, 2016, which are hereby incorporated by reference for all purposes as if fully set forth herein.

BACKGROUND

Field

Exemplary embodiments of the present invention relate to a light emitting apparatus, a planar surface light source apparatus, and luminous flux control for a deterministic light deviating member, such as a Total Internal Reflection (TIR) optical lens, and an absorption filter that improves the overall uniformity of a liquid crystal display (LCD) to 90% or more.

Discussion of the Background

In the past decade, flat-screen televisions have gone from mere luxury-status to a market domination status that is so complete that the market for cathode-ray tube (CRT) televisions has been greatly reduced in size. While plasma flat-screens are similar to CRTs in having emissive pixels, the pixels of LCDs are passive, merely acting to rotate the polarization of light passing through them, so that they must be put between two orthogonal polarizers in order for the pixels to act as intensity modulators.

Originally, flat-screen LCDs provided this intensity by utilizing waveguide-based backlights that were edge-illuminated by fluorescent tubes. As light-emitting diodes (LEDs) have increased in brightness and efficacy, they replaced the fluorescent tubes while retaining the edge-illuminated waveguide. However, waveguides may be thick and heavy for large screen sizes, so that direct-view area backlights comprising hollow light boxes may be desirable because their lights are distributed all across the back of the light box. Direct-view area backlights may spread the light out uniformly to eliminate hot spots on the screen just over each LED light source, which is what LEDs without dedicated local lenses may not accomplish.

As LED technology has matured, increasing power output means that fewer LEDs may be needed to do any particular illumination task. When area backlights use fewer LEDs, especially considering the 16:9 proportions of typical high-definition televisions, uniform illumination geometry may become increasingly difficult to achieve.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide an axial symmetric TIR lens having an input cavity that reduces unwanted Fresnel reflection effects, and that when combined together with an asymmetrical absorption filter, achieves excellent LCD screen uniformity, in excess of 90%, even for LCD panels with 16:9 screen geometries.

Additional features of the invention will be set forth in the description which follows, and in part will be apparent from the description, or may be learned by practice of the invention.

Exemplary embodiments of the present invention disclose TIR illumination lenses. The TIR illumination lenses include an internal cavity surface configured to intercept light emitted by a light source, which may minimize the effect from unwanted Fresnel reflections. According to an exemplary embodiment, the shape of the internal cavity may have a pyramidal-shaped non-rotationally symmetric cross-section. According to another exemplary embodiment, the shape of the internal cavity may have a rotationally symmetric cavity. The illumination lenses according to exemplary embodiments of the present invention also include an absorption filter that improves LCD screen uniformity from 80% or more of the TIR lenses in combination with a diffuser film stack and prismatic brightness enhancing films, to a uniformity of 90% or more.

An exemplary embodiment of the present invention also discloses a light-emitting apparatus including a light-emitting element disposed on a substrate and a light flux control member, such as a TIR lens, disposed on the light-emitting element. The light flux control member includes a bottom surface section disposed on the substrate, a polygonal tilted input surface section including an inward recess disposed in the bottom surface section positioned above the light emitting element, a rotationally symmetric output surface that reflects and/or refracts light passing through the input surface section, and transmits light outside, and at least two leg sections protruding from the bottom surface section of the lens and contacting the substrate.

According to an exemplary embodiment, a light-emitting apparatus includes a light-emitting element and a lens covering the light-emitting element. The lens has an upper surface having a convex shape and a lower surface including a cavity to which light emitted from the light-emitting elements is incident, in which the cavity includes an apex facing an upper surface of the light-emitting element and configured to reduce Fresnel reflection emitted vertically.

The cavity may have a pyramidal shape in a cross-sectional view.

Each side of the cavity may cross a side of the light-emitting element in a plan view.

A height of the cavity may be about 0.5 mm.

A diameter of the lens may be in a range of 12 mm and 16 mm, and a thickness of the lens may be in a range of 3.5 mm and 4.5 mm.

The cavity may have a conical shape in a cross-sectional view.

A hypotenuse of the conical shaped cavity may have a curvature.

The hypotenuse of the conical shaped cavity may have a concave shape.

The upper surface of the lens may include a cusp formed in the center portion of the upper surface, and the apex of the cavity may substantially adjoin the central cusp in a cross-sectional view.

A bottom surface of the cavity may have a polygonal shape, and a side wall of the cavity may form an acute angle with respect to an axis vertical to the bottom surface of the cavity.

The light-emitting apparatus may further include a unit cell including a film stack. The film stack may include a diffuser and at least one brightness enhancement film (BEF)

disposed on the diffuser, and an absorption film, in which the light-emitting element may be disposed in a hole formed at the central portion of a bottom floor of the unit cell.

The absorption film may be disposed on a top surface of the film stack.

Opposing surfaces of the absorption film may each include an anti-reflective coating.

A portion of the absorption film overlapping the light-emitting element may have the lowest transmissivity.

A backlight unit may include a plurality of the light-emitting apparatus of the exemplary embodiment disposed in a matrix form, in which the light-emitting apparatus disposed in each row may overlap the light-emitting apparatus disposed in a successive row in a column direction.

A distance between adjacent light-emitting apparatus may be 100 mm.

A backlight unit may include a plurality of the light-emitting apparatus of the exemplary embodiment in a matrix form, in which the light-emitting apparatus disposed in each row may not overlap the light-emitting apparatus disposed in a successive row in a column direction.

According to an exemplary embodiment, a backlight unit includes a plurality of unit cells disposed in a matrix form, each of the unit cells includes a film stack including a diffuser, crossed prismatic brightness enhancing films (BEFs) disposed on the diffuser, and an absorption filter disposed on the BEFs, a light-emitting element disposed in a hole formed in a bottom surface of the unit cell, and a lens covering the light-emitting element and including a conical shaped cavity on a bottom surface of the lens.

A hypotenuse of the conical shaped cavity may have a curvature, and the light-emitting diode may be disposed in the conical shaped cavity.

A diameter of a bottom surface of the conical shaped cavity may be about 2.4 times greater than a longitudinal length of the light-emitting element.

The foregoing general description and the following detailed description are exemplary and explanatory and are intended to provide further explanation of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are included to provide a further understanding of the invention and are incorporated in and constitute a part of this specification, illustrate embodiments of the invention, and together with the description serve to explain the principles of the invention.

FIG. 17 shows a film stack according to an exemplary embodiment.

DETAILED DESCRIPTION OF THE ILLUSTRATED EMBODIMENTS

Figure 1A:
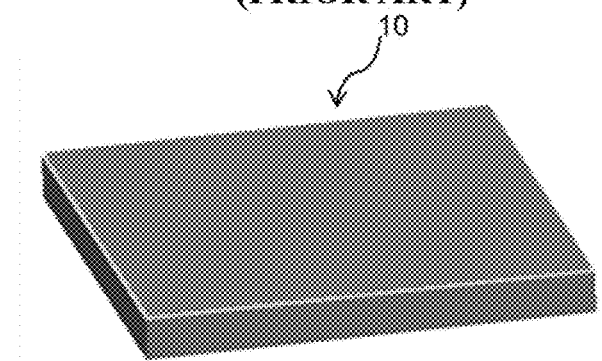
FIG. 1A, FIG. 1B, and FIG. 1C show a conventional backlight unit cell.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

A better understanding of the features and advantages of the present invention will be obtained by reference to the following detailed description of the invention and accompanying drawings, which set forth illustrative embodiments in which the principles of the invention are utilized.

Figure 1B:
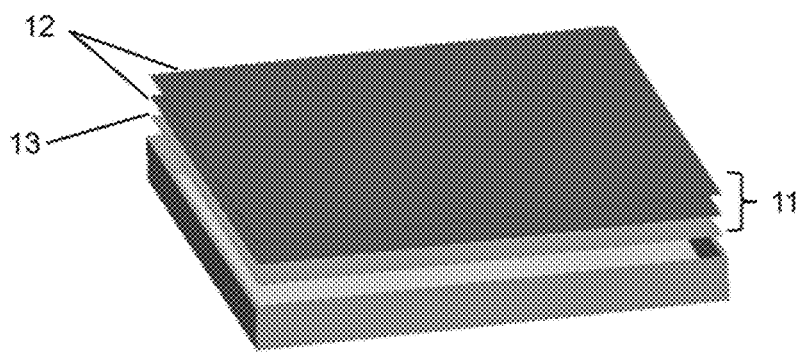
Figure 1C:
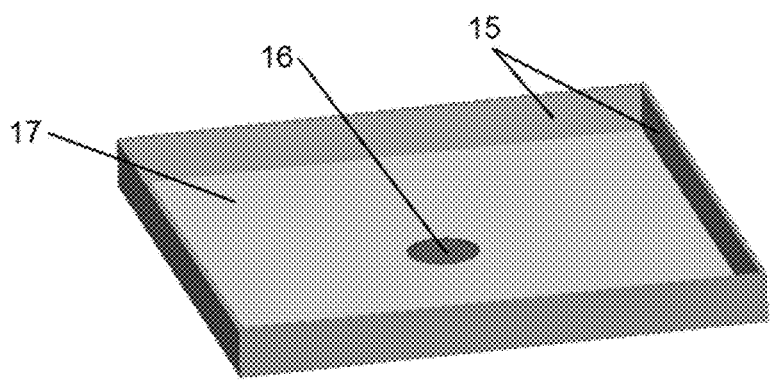
Figure 2A:
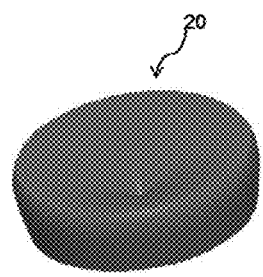
FIG. 2A and FIG. 2B show a TIR lens with a square-shaped cavity.
Figure 2B:
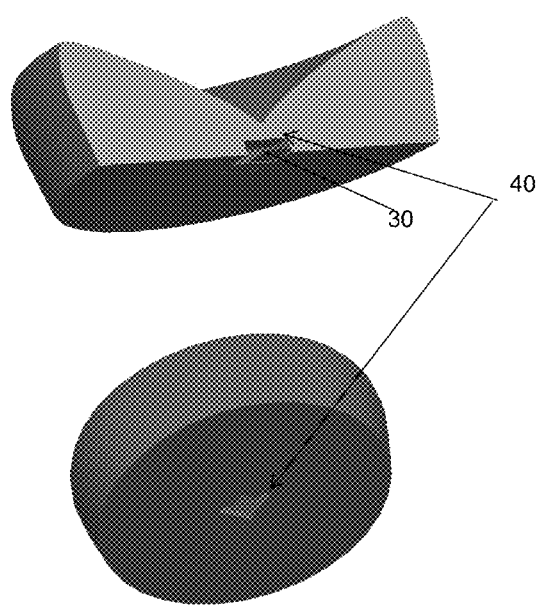
Figure 2C:
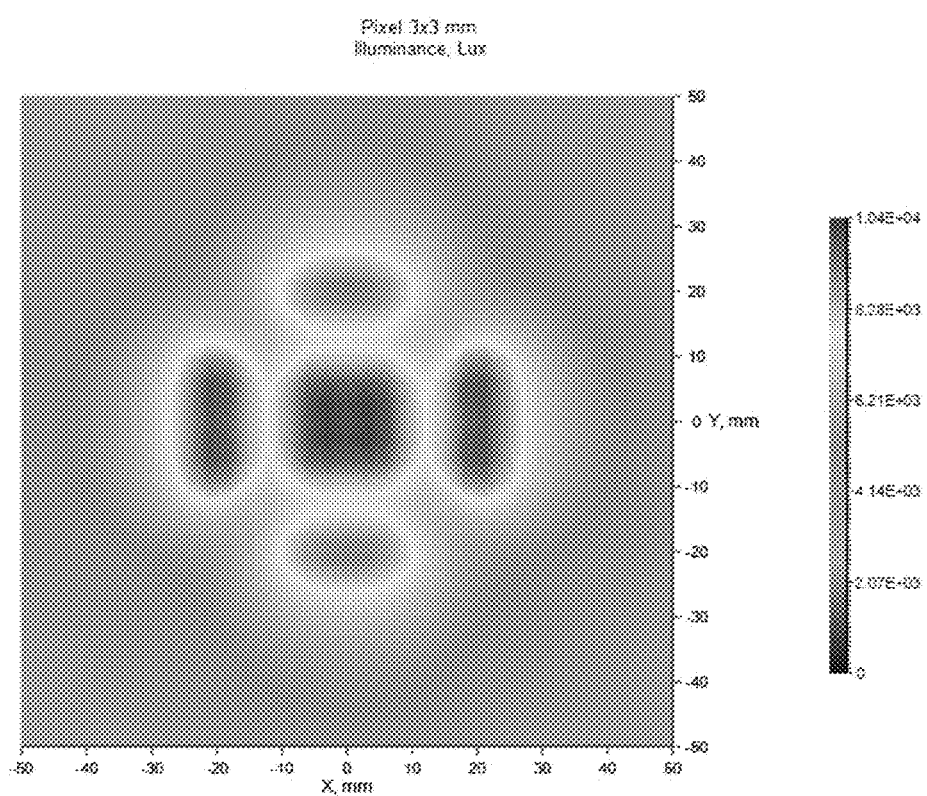
FIG. 2C shows the luminance distribution of the TIR lens of FIG. 2A placed in the backlight unit cell of FIG. 1A.

FIGS. 1A to 1C illustrate a conventional backlight unit cell. FIGS. 2A and 2B illustrate a Total Internal Reflection (TIR) lens with a square-shaped entrance cavity. FIG. 2C shows the luminance distribution of a unit cell including the TIR lens 20 of FIG. 2A placed in the backlight unit cell of FIG. 1A.

Referring to FIG. 1A to 1C, a conventional backlight unit cell 10 may have 100 mm×100 mm dimension and include a single LED (not shown), reflecting walls 15 along the four sides, and a film stack 11. The film stack 11 may include a diffuser 13 and two crossed prismatic brightness enhancing films (BEFs) 12. A reflector 17, for example, a Lambertian reflector such as a large white sheet of diffusively reflecting material, having reflectivity of about 98% may be disposed on a bottom surface of the backlight unit cell 10. A hole 16 (or cavity) may be formed in the middle of the reflector 17, and the depth of the hollow cavity 16 may be about 0.2 mm. An LED (not shown) may be disposed in the hole 16 of the backlight unit cell 10 and connected to a PCB (not shown). The LED may be covered by a TIR lens, which will be described in more detail below.

Referring to FIGS. 2A and 2B, a TIR lens 20 may be disposed on an LED 30. The TIR lens 20 may typically refract or reflect light emitted from the LED 30 into a planar or horizontal direction, thereby redirecting light from the LED 30 in a desired direction as an LED backlight for an LCD screen.

The TIR lens 20 may include transparent resin material, such as polymethylmethacrylate (PMMA), or a transparent glass with or without an anti-reflective coating. As shown in cross-sectional image of FIG. 2B, the LED 30 may be a Lambertian emitter having an emitting area of approximately 1 mm×1mm with a flux of approximately 120 lumens. The TIR lens 20 may have a inner cavity 40 on the bottom surface thereof and cover the LED 30. The inner cavity 40 of the TIR lens 20 may have a square shape in cross-sectional view, and have circular shape when viewed from the above. Light emitted from the LED 30 is incident to the square cross-sectional shaped inner cavity 40 of the TIR lens 20.

As shown in the luminance distribution of FIG. 2C, a unit cell including the TIR lens 20 of FIG. 2A placed in the backlight unit cell 10 of FIG. 1A may exhibit strong Fresnel reflection around the inner cavity 40 of the 100 mm×100 mm backlight unit cell 10. As used herein, the luminance of the backlight cell 10 is measured in a pixel having a 3×3 mm dimension.

Figure 3A:
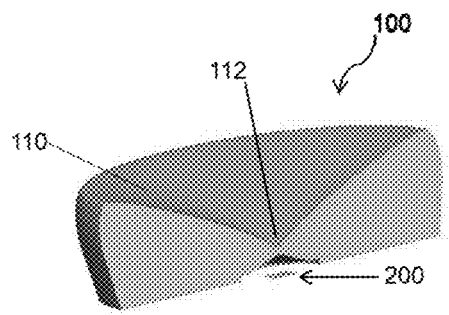
FIG. 3A, FIG. 3B, and FIG. 3C show a TIR lens having a pyramidal shaped cavity according to an exemplary embodiment.
Figure 3B:
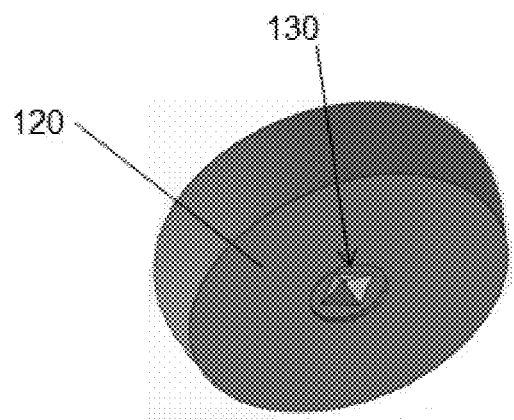
Figure 3C:
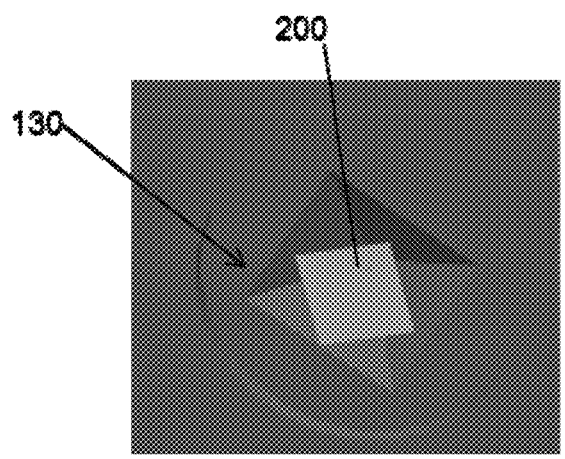
Figure 3D:
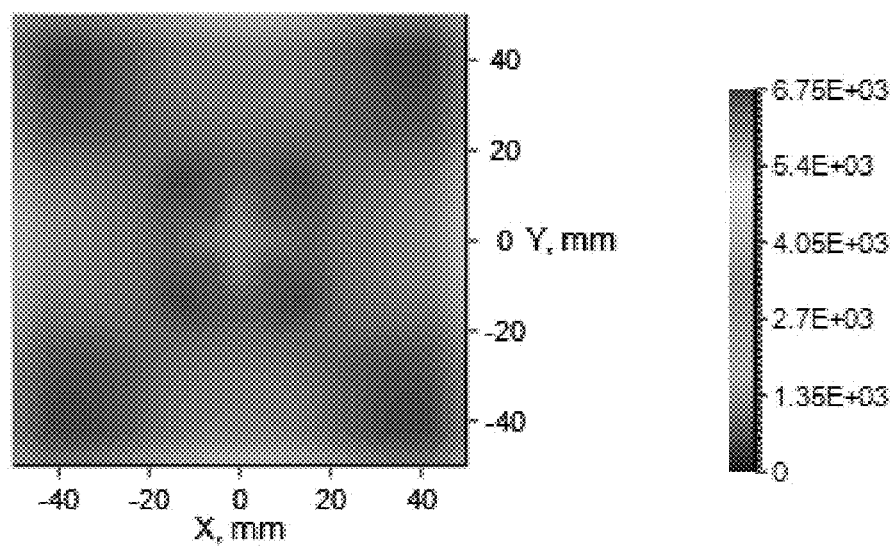
FIG. 3D shows the luminance distribution of a unit cell including the TIR lens of FIG. 3A placed in the backlight unit cell of FIG. 1A.

FIGS. 3A to 3C show a TIR lens having a pyramidal shaped cavity according to an exemplary embodiment. FIG. 3D is a graph showing the luminance distribution of a unit cell including the TIR lens of FIG. 3A placed in the backlight unit cell 10 of FIG. 1A, according to an exemplary embodiment.

Referring to FIGS. 3A to 3C, a unit cell according to an exemplary embodiment includes a TIR lens 100 covering an LED 200. The TIR lens 100 has an external surface 110 formed with a central cusp 112 in the central portion thereof, such that the TIR lens 100 has a convex shape as shown in the cross-sectional image of the TIR lens 100. The TIR lens 100 may refract or reflect light emitted from the LED 200 in a planar or horizontal direction, thereby redirecting light from the LED 200 in a desired direction. According to an exemplary embodiment, the TIR lens 100 may be non-rotationally symmetric or rotationally symmetric. As used herein, the non-rotationally symmetric may refer to a configuration, of which the vertical length (e.g., y-direction) of the external surface 110 being greater than the horizontal length (e.g., x-direction) of the external surface 110.

A bottom surface 120 of the TIR lens 100 may include a cavity 130, which may include an apex that face an upper surface of the LED 200. According to an exemplary embodiment, the cavity 130 may have a pyramidal shape. The pyramidal shaped cavity 130 may be formed into the body of the TIR lens 100 from the bottom surface 120, as illustrated in FIG. 3B. In this manner, light emitted from the LED 200 may be incident to the pyramidal shaped cavity 130 and refracted or reflected at the cavity 130 to increase light uniformity. According to an exemplary embodiment, the TIR lens 100 may have a diameter about 15.5 mm and a thickness about 4.5 mm, without being limited thereto. According to an exemplary embodiment, the shape of the cavity 130 may be varied without being limited to a pyramidal shape. For example, a bottom surface of the cavity 130 may have a polygonal shape, an apex of the cavity 130 may face the upper surface of the LED 200, and a side surface of the cavity 130 connecting an edge of the bottom surface and the apex of the cavity 130 may be inclined. In other words, the side surface of the cavity 130 may form an acute angle with respect to an axis vertical to the upper surface of the LED 200.

Referring to FIG. 3C, according to an exemplary embodiment, the pyramidal shaped cavity 130 is disposed at about 45° with respect to the LED 200 in a plan view. More particularly, a side of the LED 200 may intersect an adjacent side of the pyramidal shaped cavity 130 in a plan view, and an angle formed between the two sides may be about 45°, which may increase light uniformity and optical efficiency. In this manner, multiple reflections from the pyramidal side walls randomize the Fresnel reflections in such a way as to greatly increase uniformity at the surfaces of the crossed BEFs 12 of the film stack 11 shown in FIG. 1B.

FIG. 3D is a graph showing the luminance distribution of a unit cell including the TIR lens of FIG. 3A, measuring 10M rays in a pixel having 3×3 mm dimension. According to an exemplary embodiment, the illuminance uniformity was about 82.3±2.7 (%), brightness after diffuser was 8985 nits at peak, the luminous intensity was 89.8 candela, and the optical efficiency was 52.4%. As used herein, the optical efficiency refers to a flux after a diffuser as compared to a flux from all LEDs. As shown in FIG. 3D, the unit cell including the TIR lens of FIG. 3A according to an exemplary embodiment significantly reduces the Fresnel reflections as compared to that of the backlight unit cell 10 shown in FIG. 2C.

Figure 4:
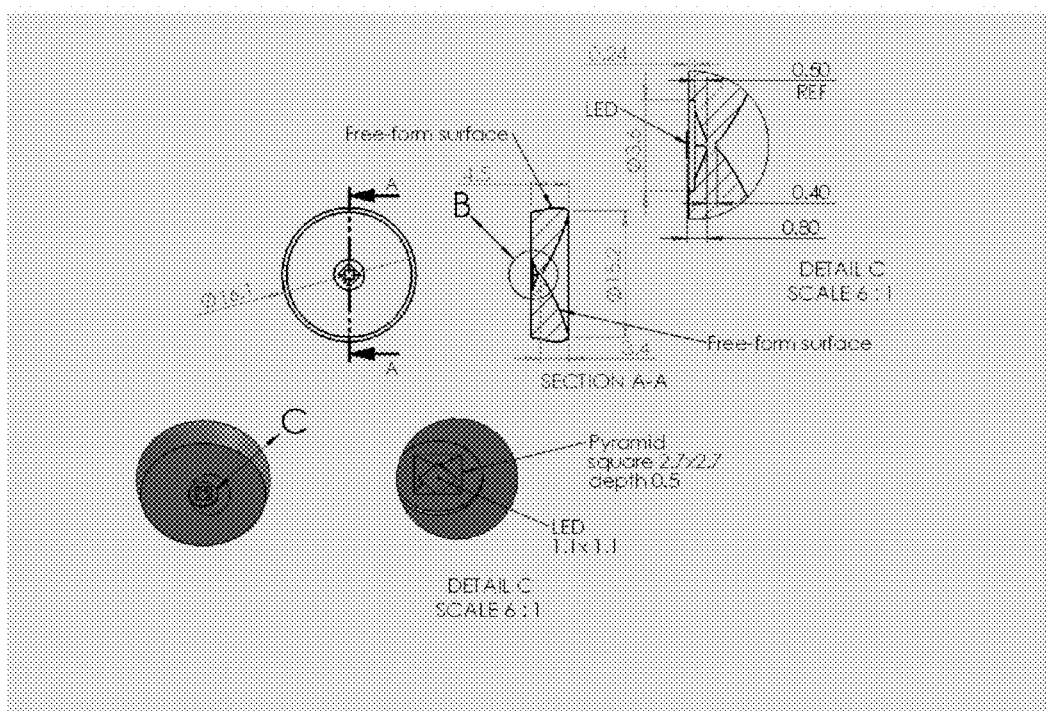
FIG. 4 shows the geometry and dimensions of the pyramidal shaped cavity of the TIR lens of FIG. 3A according to an exemplary embodiment.

FIG. 4 shows the geometry and dimensions of the pyramidal shaped cavity 130 of FIG. 3B according to an exemplary embodiment.

Figure 5:
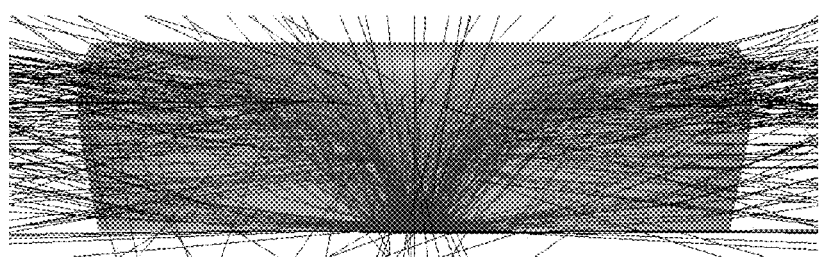
FIG. 5 shows ray tracing of light propagated through the TIR lens of FIG. 3A according to an exemplary embodiment.

FIG. 5 shows ray tracing of light propagated through the TIR lens 100 of FIG. 3A according to an exemplary embodiment. As shown in FIG. 5, light normally directed in a vertical direction is sent substantially in a horizontal direction.

Figure 6A:
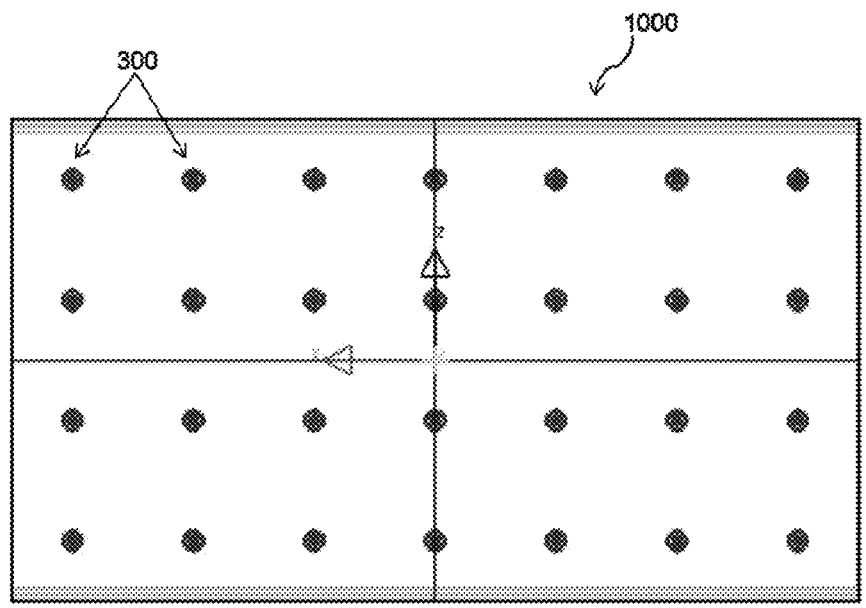
FIG. 6A shows a backlight array including the unit cells of FIG. 3D according to an exemplary embodiment.
Figure 7A:
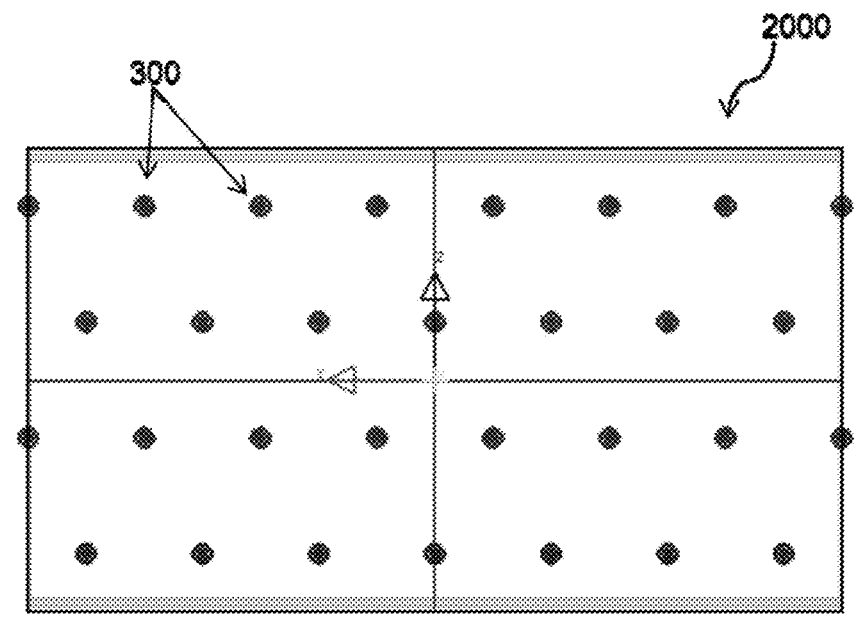
FIG. 7A shows a backlight array including the unit cells of FIG. 3D according to an exemplary embodiment.

FIG. 6A shows a backlight array including the unit cells including the TIR lens of FIG. 3A according to an exemplary embodiment. FIG. 7A shows a backlight array including the unit cells including the TIR lens of FIG. 3A according to an exemplary embodiment.

Referring to FIG. 6A, a backlight array 1000 according to an exemplary embodiment includes multiple unit cells 100. The unit cells 300 of the backlight array 1000 may be substantially the same as the unit cell illustrated in FIG. 1A, and each unit cell 300 may include the TIR lens of FIG. 3A, and thus, repeated description thereof will be omitted. Although the backlight array 1000 of FIG. 6A shows 7 unit cells 300 formed along the horizontal direction (e.g., x-axis) and 4 unit cells formed along the vertical direction (e.g., z-axis), the total number of unit cells in the backlight array 1000 may be varied without the inventive concept being limited thereto.

According to an exemplary embodiment, the backlight array 1000 includes the unit cells 300 in a rectangular pattern as shown in FIG. 6A. FIG. 6A illustrates a portion of 400 mm×700 mm HBLU LED backlight array, in which the unit cell position in successive rows being symmetrical. More particularly, the unit cells 300 in each row may be disposed to overlap the unit cells 300 in adjacent rows in the vertical direction (e.g., z-axis). Further, the unit cells 300 in each column may be disposed to overlap the unit cells 300 in adjacent columns in the horizontal direction (e.g., x-axis). Here, the LEDs in successive rows are directly beneath the LEDs in the previous rows. According to an exemplary embodiment, a distance between adjacent unit cells 300 may be about 100 mm from one another.

Figure 6B:
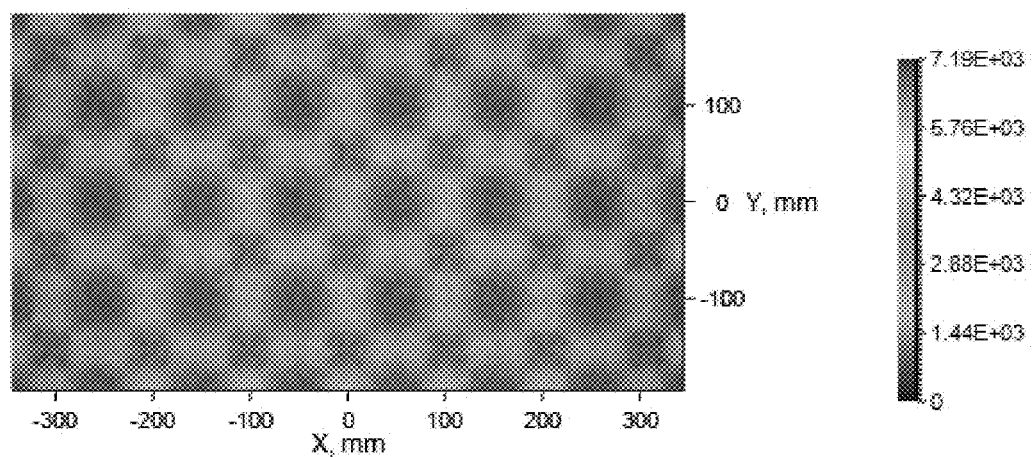
FIG. 6B shows the luminance distribution of the backlight array of FIG. 6A.

FIG. 6B is a graph showing the luminance distribution of the backlight array 1000 of FIG. 6A, measuring 10M rays in a pixel having 3×3 mm dimension. According to an exemplary embodiment, the illuminance uniformity was about 80.7±4.0 (%), brightness after diffuser was 9420 nits at peak, the luminous intensity was 2637 candela, and the optical efficiency was 52.4%.

Referring to FIG. 7A, a backlight array 2000 according to an exemplary embodiment includes multiple unit cells 100. The unit cells 300 of the backlight array 2000 may be substantially the same as the unit cell illustrated in FIG. 1A, and each unit cell 300 may include the TIR lens of FIG. 3A, and thus, repeated descriptions thereof will be omitted. Although the backlight array 2000 of FIG. 7A shows 30 unit cells 300 disposed therein, the total number of unit cells 300 in the backlight array 2000 may be varied without being limited thereto.

According to an exemplary embodiment, the backlight array 2000 includes unit cells 300 in a shifted order as shown in FIG. 7A. More particularly, the unit cells 300 in odd rows may be disposed to overlap the unit cells 300 in adjacent odd rows in the vertical direction (e.g., z-axis). Further, the unit cells 300 in odd columns may be disposed to overlap the unit cells 300 in adjacent odd columns in the horizontal direction (e.g., x-axis). In other words, the unit cells 300 disposed in the odd row may be shifted by a half pitch with regards to successive rows, such that that the unit cells 300 disposed in the odd row may not overlap the unit cells 300 disposed in the even row in the vertical direction (e.g., z-axis). For example, LEDs in successive rows are shifted by 50 mm compared to the LEDs in the row above.

Figure 7B:
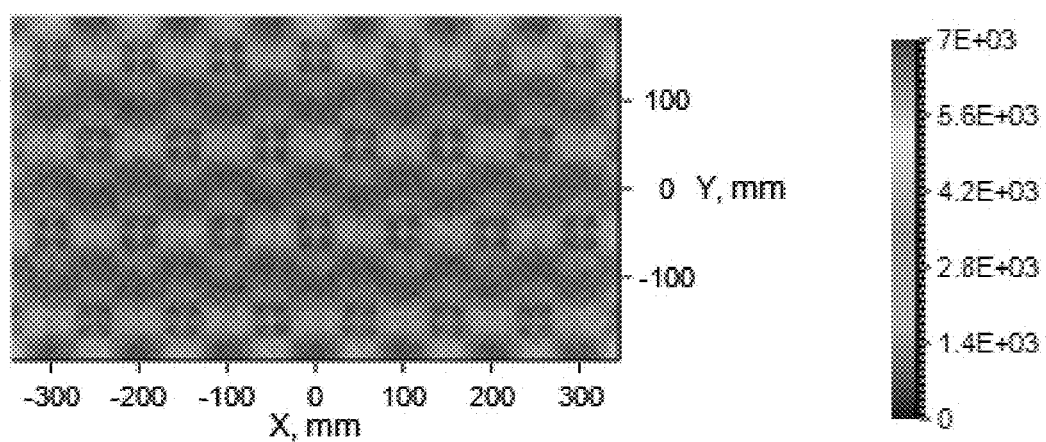
FIG. 7B shows the luminance distribution of the backlight array of FIG. 7A.

FIG. 7B shows a graph showing the luminance distribution of the backlight array 2000 of FIG. 7A, measuring 100M rays in a pixel having 3×3 mm dimension. According to an exemplary embodiment, the illuminance uniformity was about 80±4.0 (%), brightness after diffuser was 9420 nits at peak, the luminous intensity was 2637 candela, and the optical efficiency was 52.4%.

Figure 8A:
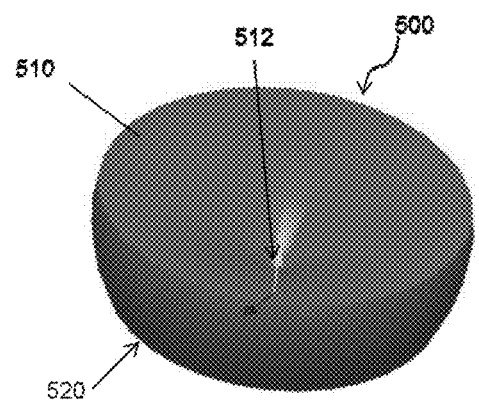
FIG. 8A, FIG. 8B, and FIG. 8C show a TIR lens having a curved conical shaped entry cavity according to an exemplary embodiment.
Figure 8B:
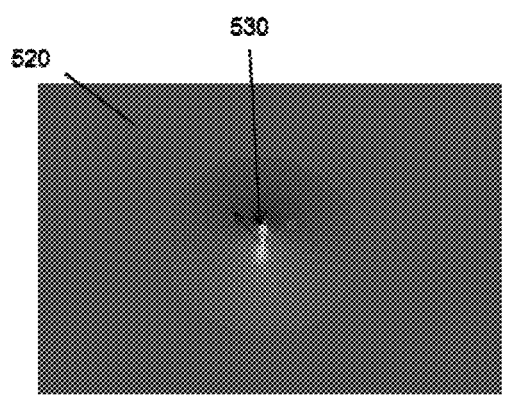
Figure 8C:
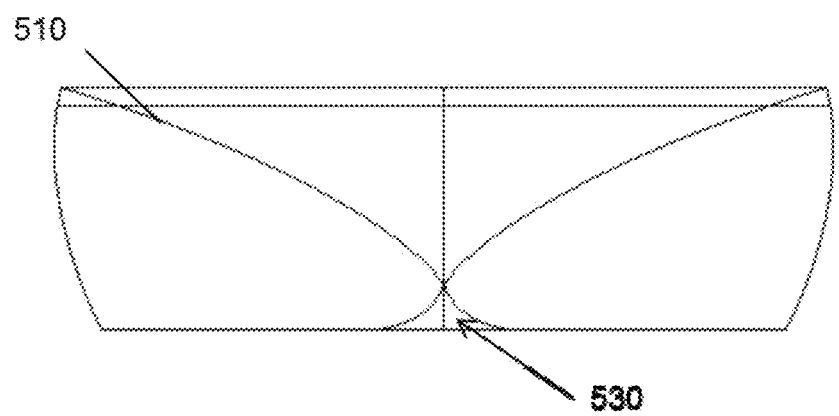
Figure 13A:
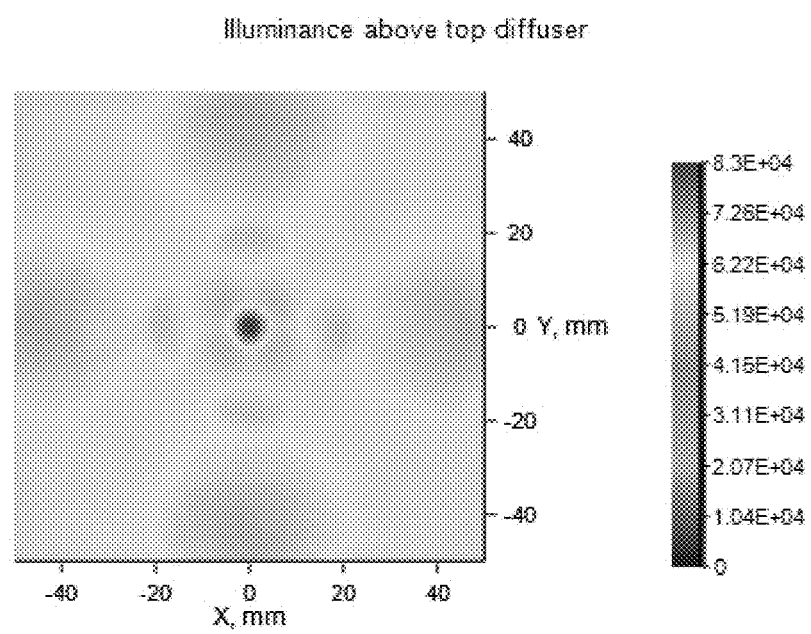
FIG. 13A and FIG. 13B are graphs of data to construct an absorption filter according to an exemplary embodiment.

FIGS. 8A to 8C show a unit cell including a TIR lens having a curved conical shaped cavity according to an exemplary embodiment. FIG. 13D is a graph showing the luminance distribution of a unit cell including the TIR lens of FIG. 13A placed in the backlight unit cell 10 of FIG. 1A according to an exemplary embodiment.

Referring to FIGS. 8A to 8C, a unit cell according to an exemplary embodiment includes a TIR lens 500 disposed on an LED (not shown). The TIR lens 500 has an external surface 510 formed with a central cusp 512 in the central portion thereof, such that the TIR lens 500 has a convex shape as shown in the cross-sectional image of the TIR lens 500. The TIR lens 500 may refract or reflect light emitted from an LED (not shown) in a planar or horizontal direction, thereby redirecting light from the LED in a desired direction. According to an exemplary embodiment, the external surface 510 of the TIR lens 500 may be non-rotationally symmetric or rotationally symmetric.

A bottom surface 520 of the TIR lens 500 may include a cavity 530, which has an apex facing an upper surface of the LED (not shown). According to an exemplary embodiment, the cavity 530 may have a curved conical shape. The curved conical shaped cavity 530 may be formed into the body of the TIR lens 500 from the bottom surface 520, as illustrated in FIG. 8C. In particular, a hypotenuse of the curved conical shaped cavity 530 may have a concave shape, as shown in the cross-sectional image of the TIR lens 500. In this manner, light emitted from an LED may be incident to the curved conical shaped cavity 530 and refracted or reflected therefrom, which increases light uniformity. In addition, the apex of the curved conical shaped cavity 530 may substantially adjoin the central cusp 512 of the TIR lens 500. According to an exemplary embodiment, the TIR lens 500 may have a diameter about 12 mm and a thickness about 3.5 mm, without being limited thereto.

Figure 8D:
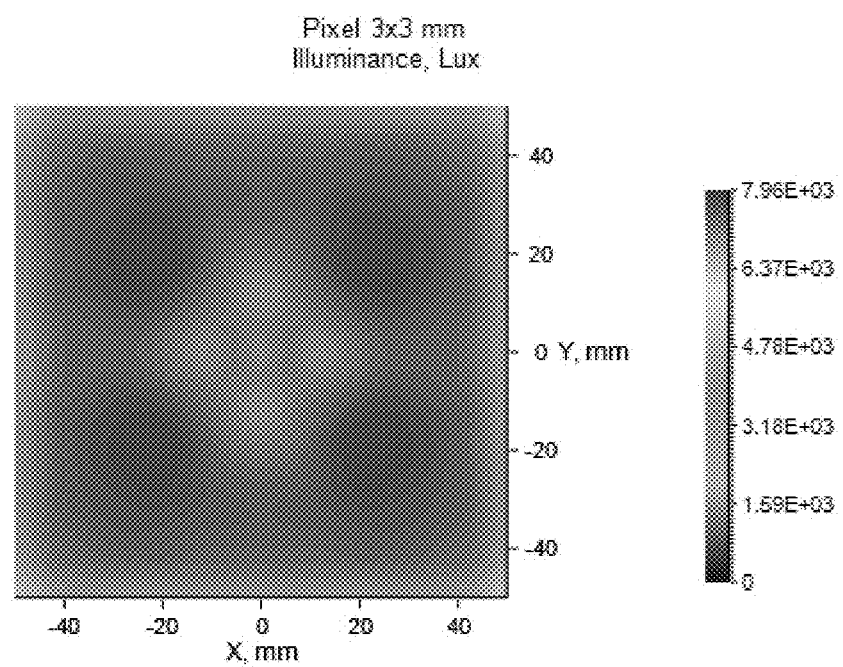
FIG. 8D shows the luminance distribution of a unit cell including the TIR lens of FIG. 8C placed in the backlight unit cell of FIG. 1A.

FIG. 8D is a graph showing the luminance distribution of a unit cell including a TIR lens of FIG. 8A placed in the backlight unit cell 10 of FIG. 1A, measuring 10M rays in a pixel having 3×3 mm dimension. According to an exemplary embodiment, the illuminance uniformity was about 86.2±2.3 (%), brightness after diffuser was 10940 nits at peak, the luminous intensity was 109.4 candela, and the optical efficiency was 62.2%. As used herein, the optical efficiency refers to flux after diffuser compared to flux from all LEDs. As shown in FIG. 8D, the unit cell including the TIR lens 500 according to an exemplary embodiment significantly reduces the Fresnel reflections as compared to that in the back light unit cell 10 shown in FIG. 2C.

Figure 9:
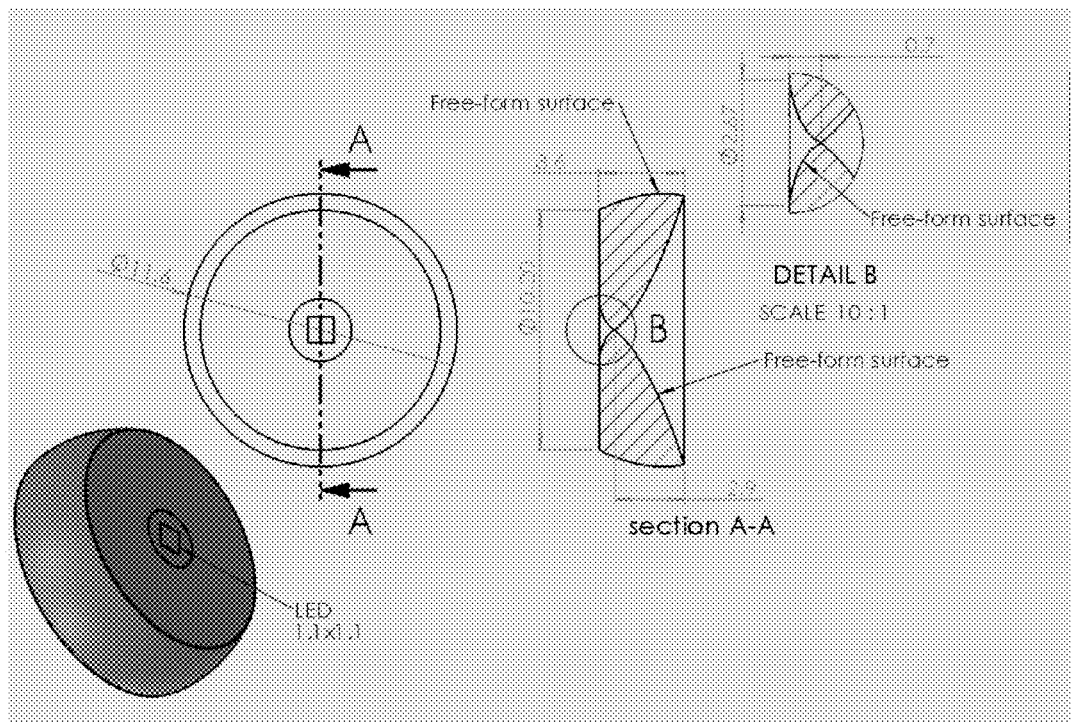
FIG. 9 shows the geometry and dimensions of the curved conical shaped cavity of FIG. 8C according to an exemplary embodiment.

FIG. 9 shows the geometry and dimensions of the curved conical shaped cavity 130 of FIG. 8C according to an exemplary embodiment. For example, the diameter of a bottom surface of the curved conical shaped cavity may be about 2.67 mm, and a horizontal length of the LED may be about 1.1 mm, without being limited thereto.

Figure 10:
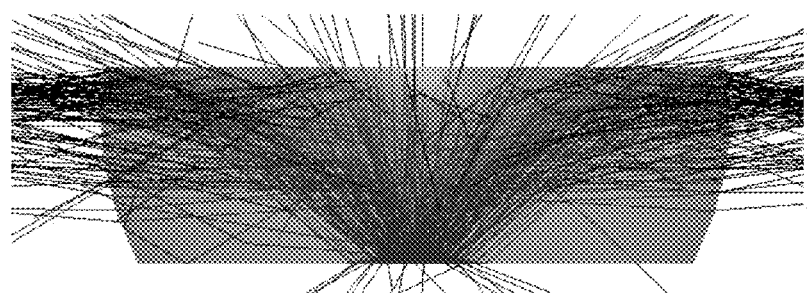
FIG. 10 shows ray tracing of light propagated through the TIR lens of FIG. 8C.

FIG. 10 shows ray tracing of light propagated through the TIR lens of FIG. 8C according to an exemplary embodiment.

Figure 11A:
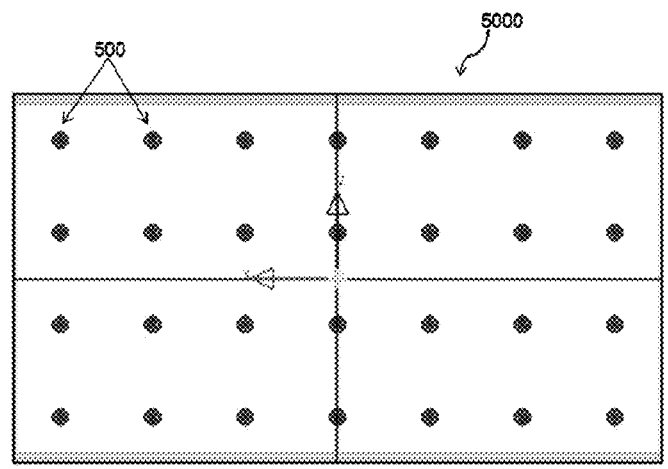
FIG. 11A shows a backlight array including the unit cells of FIG. 8D according to an exemplary embodiment.
Figure 12A:
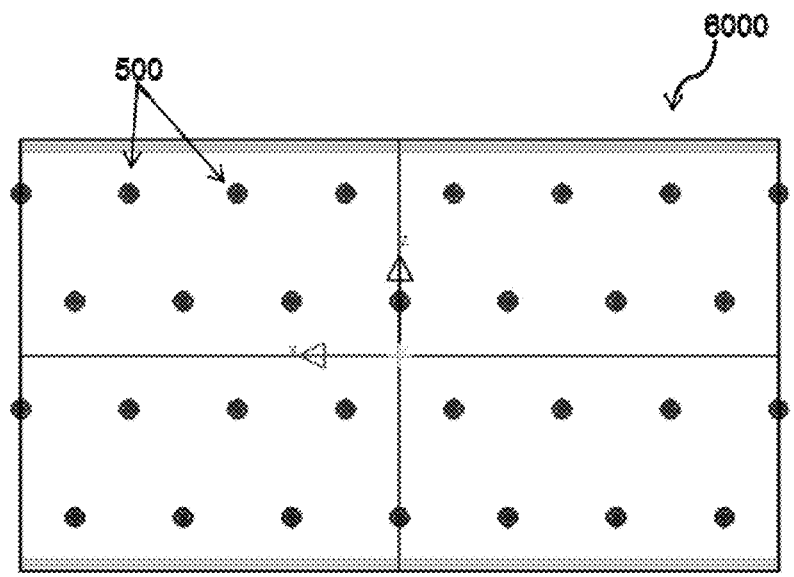
FIG. 12A shows a backlight array including the unit cells of FIG. 8D according to an exemplary embodiment.

FIG. 11A shows a backlight array including the unit cells having the TIR lens of FIG. 8C according to an exemplary embodiment. FIG. 12A shows a backlight array including the unit cells including the TIR lens of FIG. 8C according to an exemplary embodiment.

Referring to FIG. 11A, a backlight array 5000 according to an exemplary embodiment includes multiple unit cells 500. The unit cells 500 of the backlight array 5000 may be substantially the same as the unit cell illustrated in FIG. 1A, and each unit cell 500 may include the TIR lens of FIG. 8C, and thus, repeated description thereof will be omitted. Although the backlight array 5000 of FIG. 11A shows 7 unit cells 500 formed along the horizontal direction (e.g., x-axis) and 4 unit cells 500 formed along the vertical direction (e.g., z-axis), the total number of unit cells 500 in the backlight array 5000 may be varied without the inventive concept being limited thereto.

According to an exemplary embodiment, the backlight array 5000 includes unit cells 500 in a rectangular pattern as shown in FIG. 11A. FIG. 11A illustrates a portion of 400 mm×700 mm HBLU LED backlight array, in which the unit cell position in successive rows being symmetrical. More particularly, the unit cells 500 in each row may be disposed to overlap the unit cells 500 in adjacent rows in the vertical direction (e.g., z-axis). Further, the unit cells 500 in each column may be disposed to overlap the unit cells 500 in adjacent columns in the horizontal direction (e.g., x-axis).

Figure 11B:
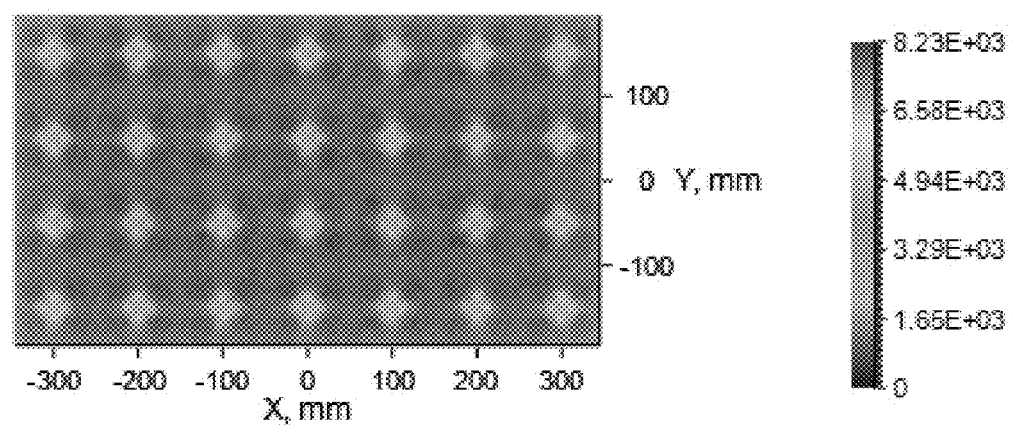
FIG. 11B shows the luminance distribution of the backlight array of FIG. 11A.

FIG. 11B shows a graph illustrating the luminance distribution of the backlight array 5000 of FIG. 11A, measuring 10M rays in a pixel having 3×3 mm dimension. According to an exemplary embodiment, the illuminance uniformity was about 78.7±3.5 (%), brightness after diffuser was 7603 nits at peak, the luminous intensity was 2129 candela, and the optical efficiency was 63.4%.

Referring to FIG. 12A, a backlight array 6000 according to an exemplary embodiment includes multiple unit cells 500. The unit cells 500 of the backlight array 6000 may be substantially the same as the unit cell illustrated in FIG. 1A, and each unit cell 500 may include the TIR lens of FIG. 8C, and thus, repeated description thereof will be omitted. Although the backlight array 6000 of FIG. 17A shows 30 unit cells 500 disposed therein, the total number of unit cells 500 in the backlight array 6000 may be varied without being limited thereto.

According to an exemplary embodiment, the backlight array 6000 includes unit cells 500 in a shifted order as shown in FIG. 12A. More particularly, the unit cells 500 in odd rows may be disposed to overlap unit cells 500 in adjacent odd rows in the vertical axis (e.g., z-axis). Further, the unit cells 500 in odd columns may be disposed to overlap the unit cells 500 in adjacent odd columns in the horizontal direction (e.g., x-axis). The unit cells 500 disposed in the odd row may be shifted by a half pitch, such that that the unit cells 500 disposed in the odd row may not overlap the unit cells 500 disposed in the even row in the vertical direction (e.g., z-axis).

Figure 12B:
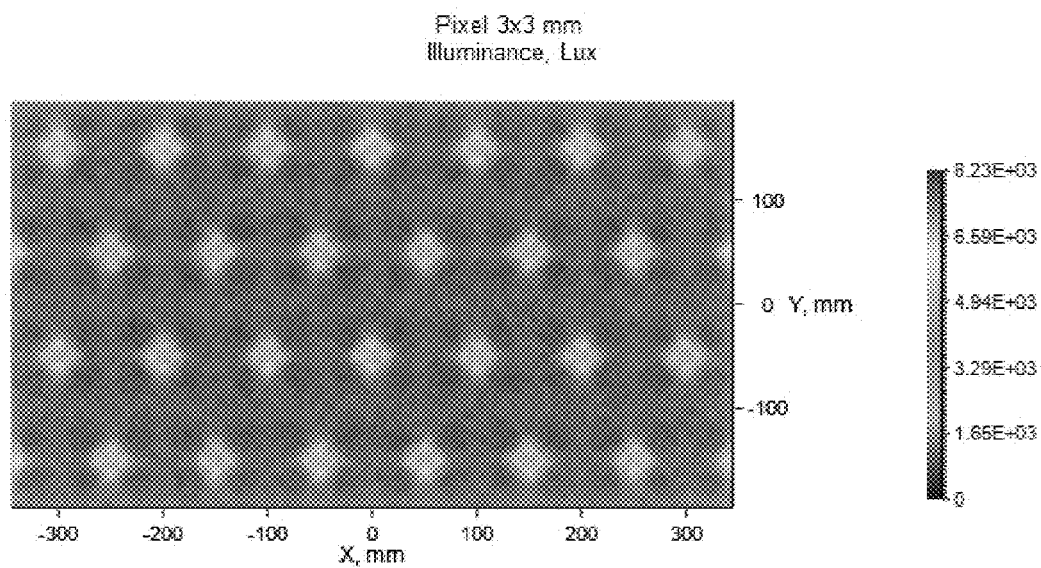
FIG. 12B shows the luminance distribution of the backlight array of FIG. 12A.

FIG. 12B shows the luminance distribution of the backlight array 6000 of FIG. 12A, measuring 100M rays in a pixel having 3×3 mm dimension. According to an exemplary embodiment, the illuminance uniformity was about 76.3±3.5 (%), brightness after diffuser was 10985 nits at peak, the luminous intensity was 3076 candela, and the optical efficiency was 61.4%.

According to an exemplary embodiment, a unit cell including a TIR lens illustrated above with reference to FIGS. 3A and 8A may further include a spatial absorption filter, which may further improve light uniformity.

Figure 13B:
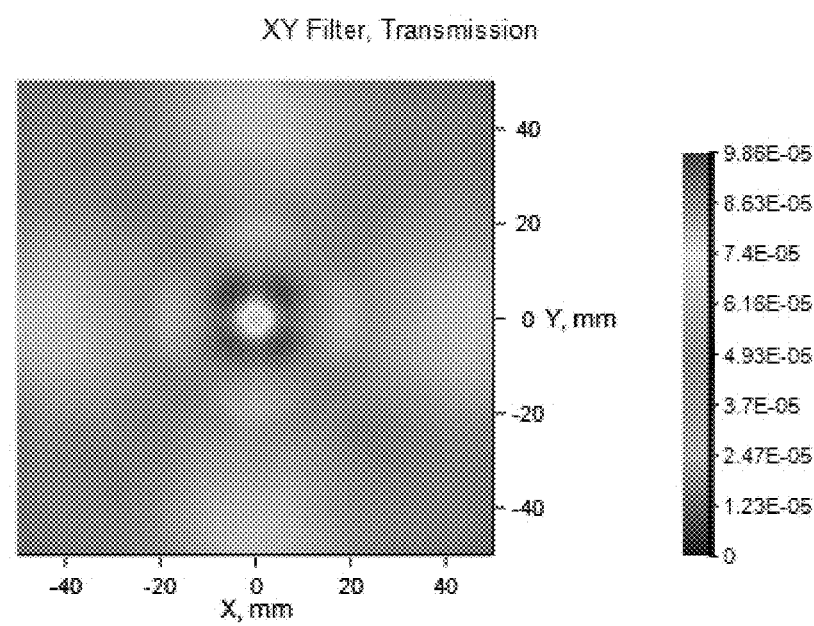
Figure 13C:
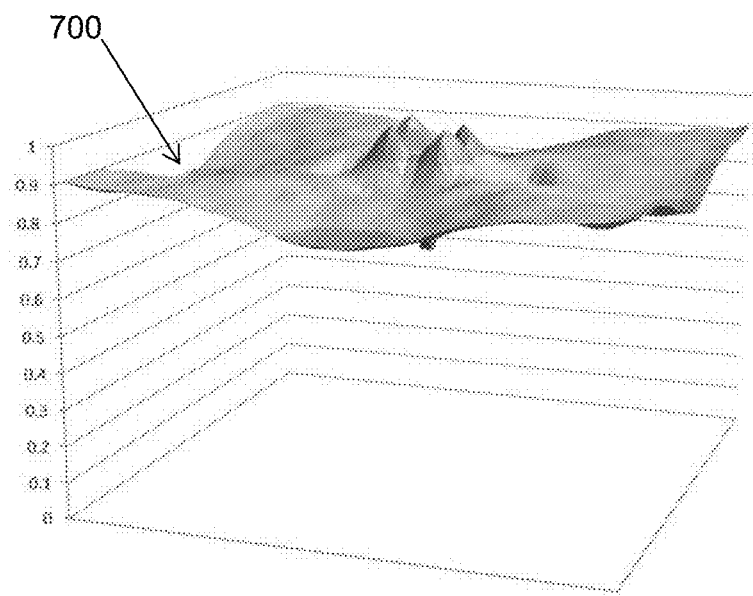
FIG. 13C shows an absorption filter according to an exemplary embodiment.

FIG. 13A and FIG. 13B are graphs of data used to construct an absorption filter according to an exemplary embodiment. FIG. 13C is a graph illustrating an absorption filter according to an exemplary embodiment.

More particularly, FIG. 13A shows an illumination distribution of a unit cell including a TIR lens according to an exemplary embodiment. Referring back to FIG. 1B, the unit cell includes a film stack 11, which may include a diffuser 13 and two crossed prismatic brightness enhancing films (BEF) 12. As shown in FIG. 13A, the illumination distribution taken from the top of the unit cell including the film stack 11 exhibits the strongest brightness around the center portion of the unit cell where an LED is disposed.

FIG. 13B shows transmission function that is associated with the illuminance distribution of FIG. 13A, such that a mere uniform illuminance is obtained as shown FIG. 13C below. The absorption filter 700 shown in FIG. 13C may absorb light, and may increase the brightness uniformity as shown in FIG. 14 described below.

Figure 14:
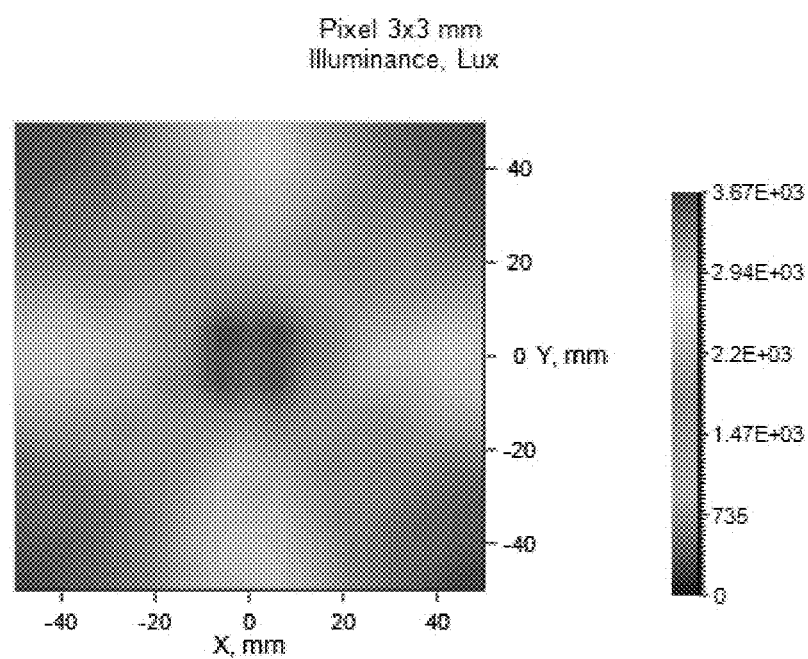
FIG. 14 shows the effect of placing the absorption filter of FIG. 13C between a diffuser and BEFs in a unit cell, according to an exemplary embodiment.

FIG. 14 shows the illumination distribution of a unit cell including a TIR lens according to exemplary embodiments, when the absorption filter is placed above the diffuser and below the two crossed prismatic BEFs.

More particularly, referring back to FIG. 1B, the film stack 11 includes a diffuser 13 and two crossed prismatic BEFs 12 disposed on the diffuser 13. In the unit cell of FIG. 14, the absorption filter according to an exemplary embodiment is disposed between the diffuser 13 and the two BEFs 12. The unit cell shown in FIG. 14 was measured with 10M rays in a pixel having 3×3 mm dimension, and the illuminance uniformity was about 77.6±3.6 (%), brightness after diffuser was 4650 nits at peak, and the luminous intensity was 46.5, and the optical efficiency was 26.7%. As can be seen, the illuminance uniformity and the optical efficiency dropped when the absorption filter was disposed between the diffuser 13 and the two BEFs 12, since the absorption filter changes the distribution of light reflected from BEFs towards the cavity of a unit cell.

Figure 15A:
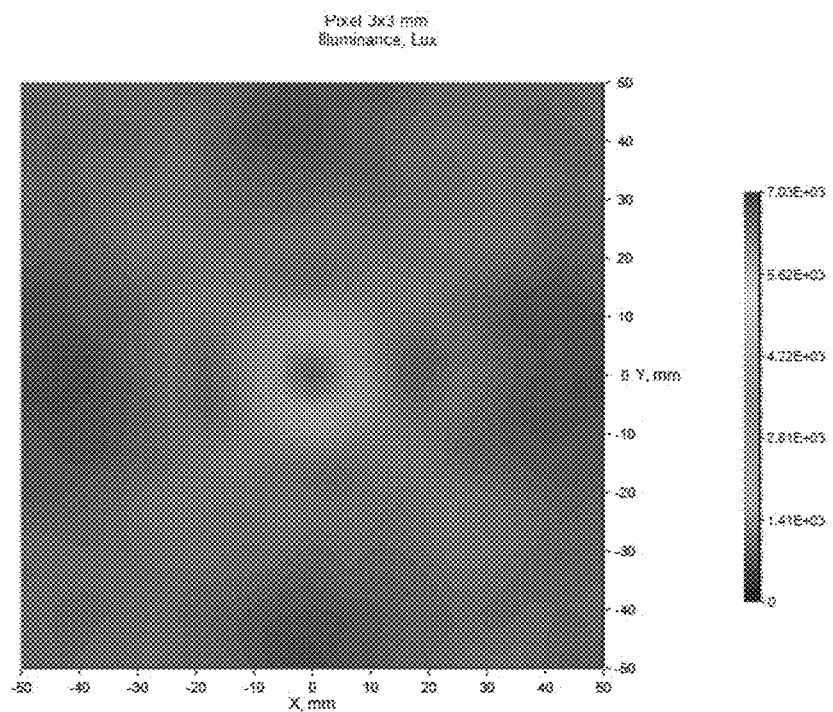
FIG. 15A shows the illuminance distribution above the film stack.
Figure 15B:
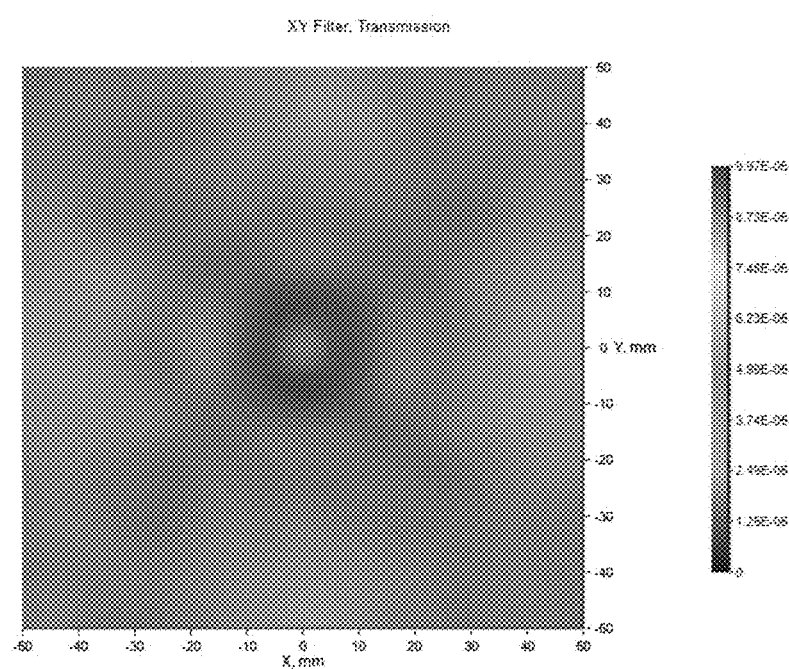
FIG. 15B shows the transmission function of a corresponding absorption film to be placed above the film stack according to an exemplary embodiment.

FIG. 15A shows the illumination distribution above the BEFs, and FIG. 15B shows the transmission function of the corresponding absorption film to be placed above the BEFs, according to an exemplary embodiment.

In the unit cell of FIGS. 15A and 15B, the absorption filter according to an exemplary embodiment is disposed on top of the two BEFs 12, which are disposed on the diffuser 13. In this manner, the absorption filter may not change light propagation inside the hollow cavity 16 (see FIG. 10), and suppresses light within local hot spots above the film stack 11. Furthermore, both surfaces of the absorption filter may be coated with an anti-reflective material, as shown in FIG. 17, which may reduce the impact of reflected light on the luminance uniformity of the unit cell.

Figure 16:
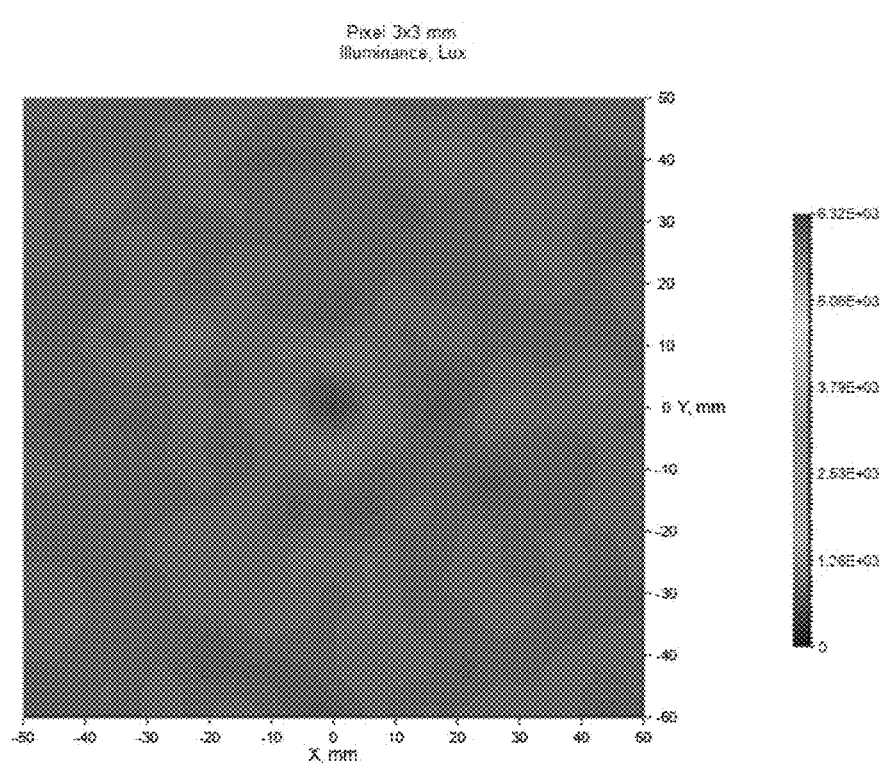
FIG. 16 shows the illuminance distribution a unit cell including the absorption filter of FIG. 13C according to an exemplary embodiment.

The unit cell shown in FIGS. 15A and 15B was measured with 10M rays in a pixel having 3×3 mm dimension, and the illuminance uniformity of FIG. 16 was about 92.9±3.0 (%), brightness after diffuser was 8710 nits at peak, and the luminous intensity was 87.1 candela, and the optical efficiency was 50%, as shown in FIG. 16. As shown in FIG. 16, forming the absorption filter on a top surface of the film stack 11 in a unit cell including a TIR lens with pyramidal or curved conical shaped cavities according to exemplary embodiments, achieved illuminance uniformity over 90% with an optical efficiency of 50%.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light-emitting apparatus comprising:
    a light-emitting element;
    a lens covering the light-emitting element, the lens comprising:
        an upper surface having a convex shape; and
        a lower surface comprising a cavity to which light emitted from the light-emitting elements is incident; and
    a unit cell comprising a film stack, the film stack comprising:
        a diffuser; and
        at least one brightness enhancement film (BEF) disposed on the diffuser; and
        an absorption film,
    wherein the cavity comprises an apex facing an upper surface of the light-emitting element and configured to reduce Fresnel reflections emitted vertically,
    wherein the light-emitting element is disposed in a hole formed at the central portion of a bottom floor of the unit cell, and
    wherein opposing surfaces of the absorption film each comprises an anti-reflective coating.

2. The light-emitting apparatus of claim 1, wherein the cavity has a pyramidal shape in a cross-sectional view.

3. The light-emitting apparatus of claim 2, wherein each side of the cavity crosses a side of the light-emitting element in a plan view.

4. The light-emitting apparatus of claim 3, wherein a height of the cavity is about 0.5 mm.

5. The light-emitting apparatus of claim 1, wherein:
    a diameter of the lens is in a range of 12 mm and 16 mm; and
    a thickness of the lens is in a range of 3.5 mm and 4.5 mm.

6. The light-emitting apparatus of claim 1, wherein the cavity has a conical shape in a cross-sectional view.

7. The light-emitting apparatus of claim 6, wherein a hypotenuse of the conical shaped cavity has a curvature.

8. The light-emitting apparatus of claim 7, wherein the hypotenuse of the conical shaped cavity has a concave shape.

9. The light-emitting apparatus of claim 8, wherein:
    the upper surface of the lens comprises a cusp formed in the center portion of the upper surface; and
    the apex of the cavity substantially adjoins the cusp in a cross-sectional view.

10. The light-emitting apparatus of claim 1, wherein:
    a bottom surface of the cavity has a polygonal shape; and
    a side wall of the cavity forms an acute angle with respect to an axis vertical to the bottom surface of the cavity.

11. A light-emitting apparatus comprising:
    a light-emitting element; and
    a lens covering the light-emitting element, the lens comprising:
        an upper surface having a convex shape; and
        a lower surface comprising a cavity to which light emitted from the light-emitting elements is incident; and
    a unit cell comprising a film stack, the film stack comprising:
        a diffuser; and
        at least one brightness enhancement film (BEF) disposed on the diffuser; and
        an absorption film,
    wherein the cavity comprises an apex facing an upper surface of the light-emitting element and configured to reduce Fresnel reflections emitted vertically,
    wherein the light-emitting element is disposed in a hole formed at the central portion of a bottom floor of the unit cell,
    wherein the absorption film is disposed on a top surface of the film stack, and
    wherein a portion of the absorption film overlapping the light-emitting element has the lowest transmissivity.

12. A backlight unit, comprising:
    a plurality of the light-emitting apparatus of claim 1 disposed in a matrix form,
    wherein the light-emitting apparatus disposed in each row overlap the light-emitting apparatus disposed in a successive row in a column direction.

13. The backlight unit of claim 12, wherein a distance between adjacent light-emitting apparatus is 100 mm.

14. A backlight unit, comprising:
    a plurality of the light-emitting apparatus of claim 1 disposed in a matrix form,
    wherein the light-emitting apparatus disposed in each row do not overlap the light-emitting apparatus disposed in a successive row in a column direction.

* * * * *